United States Patent
Okulan et al.

(10) Patent No.: US 7,370,515 B2
(45) Date of Patent: May 13, 2008

(54) PROBES FOR USE IN SCANNING PROBE MICROSCOPES AND METHODS OF FABRICATING SUCH PROBES

(75) Inventors: Nihat Okulan, Santa Barbara, CA (US); Ami Chand, Goleta, CA (US)

(73) Assignee: Veeco Instruments Inc., Woodbury, NY (US)

( * ) Notice: Subject to any disclaimer, the term of this patent is extended or adjusted under 35 U.S.C. 154(b) by 0 days.

(21) Appl. No.: 10/873,064

(22) Filed: Jun. 21, 2004

(65) Prior Publication Data

US 2005/0279729 A1    Dec. 22, 2005

(51) Int. Cl.
*G01B 5/28* (2006.01)
(52) U.S. Cl. ....................................... 73/105
(58) Field of Classification Search ................. 73/105; 250/306, 307
See application file for complete search history.

(56) References Cited

U.S. PATENT DOCUMENTS

| | | | | |
|---|---|---|---|---|
| 4,104,549 | A * | 8/1978 | Akimoto et al. ............... 310/26 |
| 4,968,585 | A | 11/1990 | Albrecht et al. ............. 430/320 |
| 5,043,693 | A * | 8/1991 | Edelstein ................... 338/32 R |
| 5,116,462 | A | 5/1992 | Bartha et al. ................ 156/643 |
| 5,242,541 | A | 9/1993 | Bayer et al. ................. 156/653 |
| 5,302,239 | A | 4/1994 | Roe et al. .................... 156/643 |
| 5,382,795 | A | 1/1995 | Bayer et al. ................. 250/306 |
| 5,883,387 | A | 3/1999 | Matsuyama et al. ......... 250/306 |
| 6,066,265 | A | 5/2000 | Galvin et al. .................. 216/2 |
| 6,091,124 | A * | 7/2000 | Bayer et al. ................. 257/417 |
| 6,339,217 | B1 * | 1/2002 | Kley ........................... 250/216 |
| 6,386,217 | B1 * | 5/2002 | Cooper et al. ................. 135/74 |
| 6,504,152 | B2 * | 1/2003 | Hantschel et al. ........... 250/306 |
| 6,583,412 | B2 * | 6/2003 | Williams .................... 250/306 |
| 6,694,805 | B2 * | 2/2004 | Shiotani et al. ................ 73/105 |
| 6,705,154 | B2 * | 3/2004 | Nakayama et al. ............ 73/105 |
| 6,817,231 | B2 * | 11/2004 | Yasutake et al. .............. 73/105 |
| 6,832,508 | B2 * | 12/2004 | Prakash ........................ 73/105 |
| 2005/0003518 | A1 * | 1/2005 | Aviram et al. ........... 435/287.1 |

FOREIGN PATENT DOCUMENTS

| | | |
|---|---|---|
| EP | 0413040 | 2/1991 |
| EP | 0483579 | 5/1992 |
| WO | WO99/58925 | 11/1999 |

OTHER PUBLICATIONS

Ronald Dixson et al., *Implementation of a Reference Measurement System Using CD-AFM*, Proceedings of SPIE vol. 5038, pp. 150-165 (2003).

* cited by examiner

*Primary Examiner*—Robert Raevis
(74) *Attorney, Agent, or Firm*—Wood, Herron & Evans, LLP

(57) ABSTRACT

Probes for use in a scanning probe microscope and methods of manufacturing such probes. Each probe includes a probe tip having a substantially vertical sidewall formed by an anisotropic etching process and a flared post underlying the probe tip that is formed by an etching process that is not anisotropic. A source gas comprising a bromine-containing gas and an oxygen-containing gas is used to etch the probe tip and flared post of the probe in a batch process. The probe tips may be qualified using any suitable criterion for use by a customer in an atomic force microscope without individual inspection.

26 Claims, 6 Drawing Sheets

PROBES FOR USE IN SCANNING PROBE MICROSCOPES AND METHODS OF FABRICATING SUCH PROBES

FIELD OF THE INVENTION

The invention relates to probe microscopy and, more particularly, to probes for use in a scanning probe microscope and methods of fabricating such probes.

BACKGROUND OF THE INVENTION

Atomic force microscopes (AFM's) were developed, among other reasons, to meet a demand in the semiconductor industry for accurately measuring critical dimensions (CDs) during integrated circuit (IC) fabrication. Critical dimensions constitute the width of a line or space on a substrate identified as crucial for proper operation of the device being fabricated. Critical dimensions are measured on some or all of a batch of substrates following any photolithography or etching process in which the dimensions are critical. A critical dimension may be the width of a patterned line, the distance between two lines or devices, or the size of a contact.

Due to their inherently high spatial resolution, AFM's are well suited for measuring critical dimensions nondestructively during process stages of IC fabrication. Generally, AFM's are equipped to sense atoms on or in sample surfaces, thereby providing atomic level surface imaging for measuring critical dimensions at a significantly higher resolution than comparable measurements taken from cross-sectional scanning electron micrographs acquired before and after an IC fabrication stage. AFM images are reconstructed from digital data acquired during grid scanning of a probe tip across the sample surface. Probe tips for measuring critical dimensions must be capable of resolving nanometer size structures.

Conventional processes for fabricating probe tips capable of measuring critical dimensions suffer from several disadvantages that limit not only process yield, but the quality of the probe tips as well. In particular, CD probe tips exhibit a limited cantilever-to-tip height, which negatively affects AFM performance due, for example, to low quality factors and high squeeze film dampening. In addition, conventional fabrication processes for CD probe tips may rely on a wet etching process, which restricts control over tip shape and makes batch processing difficult. Another conventional fabrication process for CD probe tips relies on dry etching with a plasma formed from a source gas composed primarily of a fluorine-based gas, such as sulfur hexafluoride ($SF_6$). However, such conventional dry etching processes produce extraneous projections at locations other than the intended locations for the probe tips. The presence of these extraneous projections lowers process yields, which is a significant hindrance to batch fabrication of probe tips. As a result, conventional probe tips are manufactured individually with multiple tedious inspections made using scanning electron microscopy at various stages of the manufacturing process to verify tip quality and to adjust, if necessary, the dry etching process recipe.

What is needed, therefore, are probes and probe tips suitable for use in an atomic force microscope to measure critical dimensions and methods of accurately manufacturing such probes and probe tips that overcome these and other deficiencies of conventional probes and probe tips and conventional manufacturing methods.

SUMMARY OF THE INVENTION

In accordance with an embodiment of the invention, a probe for an atomic force microscope comprises a tip and a flared post underlying the tip. The flared post is configured to couple the tip with the atomic force microscope. The tip is characterized by a diameter of greater than about twenty nanometers.

In accordance with another embodiment of the invention, a probe for an atomic force microscope comprises a tip and a flared post underlying the tip. The flared post is configured to couple the tip with an atomic force microscope. At least a portion of the tip is formed of a material different from at least a portion of the flared post.

In accordance with yet another embodiment of the invention, a method of forming a probe for an atomic force microscope includes forming and patterning a hard mask to define a location for forming a tip on a substrate. The tip is formed at the location by etching the substrate to a first depth using a first dry etching process that is substantially anisotropic. A flared post is also formed that couples the tip with the substrate by etching the substrate to a second depth using a second dry etching process.

The fabrication process forming the probe tip and flared post of the AFM probes of the invention relies on a multiple-stage sequential dry etching process. Each stage of the dry etching process uses a plasma generated from a source gas including a bromine-containing gas and an oxygen-containing source gas and, optionally, one or both of a chlorine-containing gas and a fluorine-containing gas. For controlling tip shape, the source gas mixture for the dry etching process forming the probe tip has a lower oxygen concentration than the source gas mixture for the dry etching process forming a flared length of the post. The increased oxygen concentration and decreased etch power contribute to the observed differences between the dry etching processes. The high degree of controllability and reproducibility of dry etching processes permits batch fabrication of the AFM probes at a relatively low cost, yet with a high process yield. In particular, the dry etching processes form probe tips at intended locations on a wafer without inadvertently forming extraneous projections at other unintended locations on the wafer. The dry etching process also permits probe tips to be formed with a greater length than conventional probe tips and without the appearance of extraneous projections at locations on the wafer surface other than the intended locations for the probe tips. The probe tips of the invention may be manufactured with a cantilever-to-tip height that exceeds that which is available with conventional fabrication techniques.

These and other objects and advantages of the present invention shall become more apparent from the accompanying drawings and description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Although the invention will be described next in connection with certain embodiments, the probe of the invention is not limited to use in any one specific type of atomic force microscope (AFM). Exemplary AFM's in which the probes of the invention can be used are commercially available, for example, from Veeco Metrology Group (Santa Barbara, Calif.). The description of the invention is intended to cover all alternatives, modifications, and equivalent arrangements as may be included within the spirit and scope of the invention as defined by the appended claims.

Figure 1:
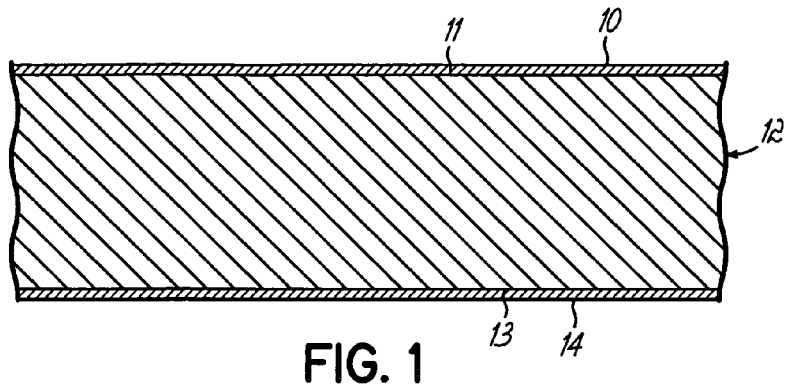
FIG. 1 is a diagrammatic cross-sectional view of a portion of a substrate.

With reference to FIG. 1, a hard mask 10 is deposited or grown as a uniformly thick surface layer on a substantially-planar and horizontal front surface 11 of a wafer 12. A layer 14 of the hard mask material is also formed on a rear surface 13 of the wafer 12. In one embodiment, the wafer 12 is silicon and the material forming hard mask 10 and layer 14 is oxide grown by any suitable technique, such as wet oxidation, dry oxidation, or a combination of these oxidation processes, or deposited by a conventional method.

References herein to terms such as "vertical", "horizontal", etc. are made by way of example, and not by way of limitation, to establish a frame of reference. The term "horizontal" as used herein is defined as a plane parallel to the conventional plane or surface of wafer 12, regardless of orientation. The term "vertical" refers to a direction perpendicular to the horizontal, as just defined. Terms, such as "on", "above", "below", "side" (as in "sidewall"), "higher", "lower", "over", "beneath" and "under", are defined with respect to the horizontal plane. It is understood that various other frames of reference may be employed without departing from the spirit and scope of the invention.

Figure 2:
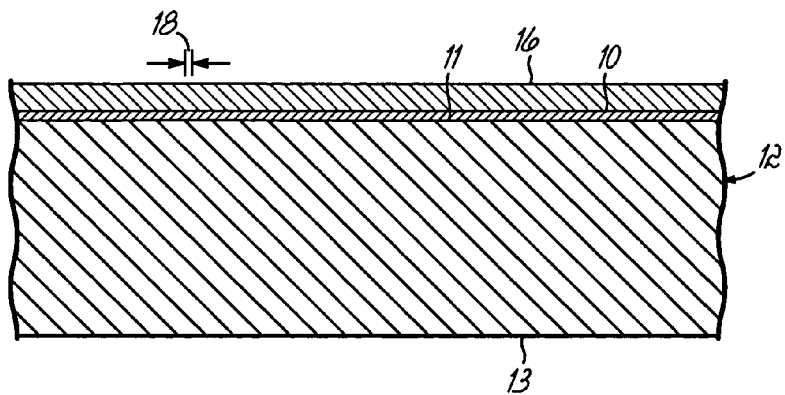
FIG. 2 is a cross-sectional view similar to FIG. 1 at a subsequent fabrication stage.
Figure 3:
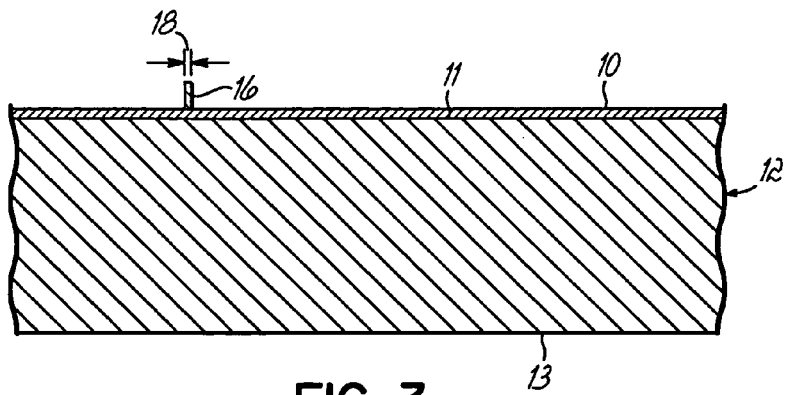
FIG. 3 is a cross-sectional view similar to FIG. 2 at a subsequent fabrication stage.

With reference to FIGS. 2 and 3 in which like reference numerals refer to like features in FIG. 1 and at a subsequent fabrication stage, a resist layer 16 is applied onto the hard mask 10 and patterned using a conventional lithographic operation to define a plurality of masked areas 18. After developing, the remaining masked areas 18 of resist layer 16 overlie surface areas on surface 11 of hard mask 10 defining the intended locations of probe tips. The masked areas 18 also have dimensions corresponding to a desired width for the probe tip. The masked areas 18 may be arranged in one- or two-dimensional arrays.

Figure 4:
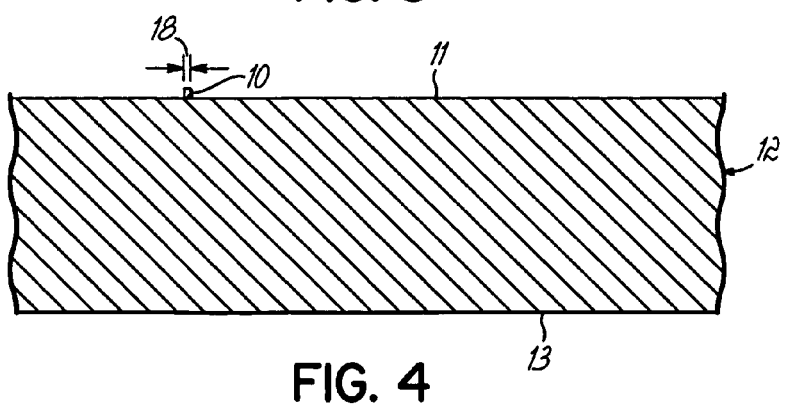
FIG. 4 is a cross-sectional view similar to FIG. 3 at a subsequent fabrication stage.
Figure 4A:
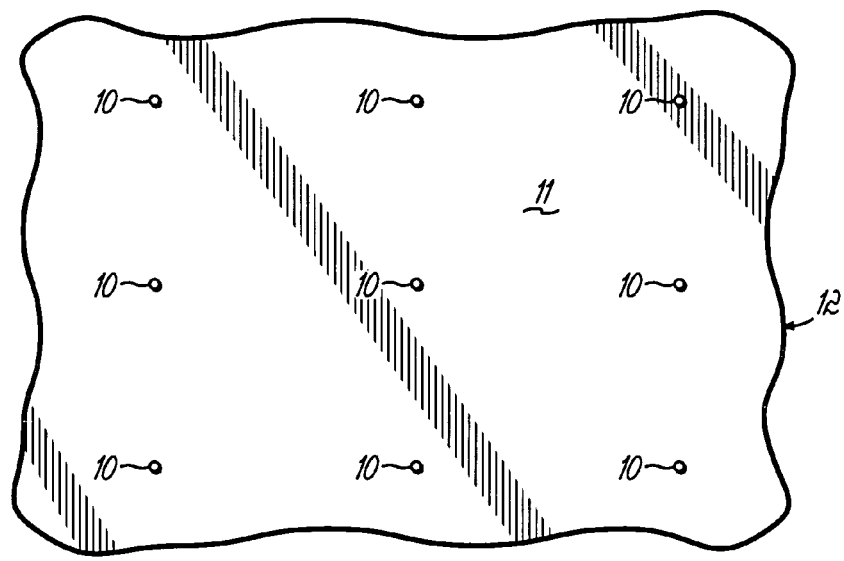
FIG. 4A is a top view of the substrate of FIG. 4.

With reference to FIGS. 4 and 4A in which like reference numerals refer to like features in FIG. 3 and at a subsequent fabrication stage, hard mask 10 is removed by any suitable etching process across the wafer 12 in areas outside the residual masked areas 18. As a result, the pattern in the resist layer 16 is transferred to the hard mask 10. The patterned resist layer 16 is subsequently stripped. The residual portions of hard mask 10 in the masked areas 18 serve as a template for forming the probe tips 20 (FIG. 5).

Figure 5:
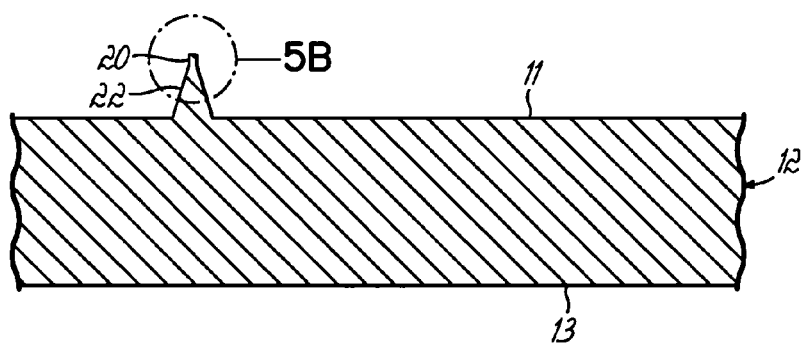
FIG. 5 is a cross-sectional view similar to FIG. 4 at a subsequent fabrication stage.
Figure 5A:
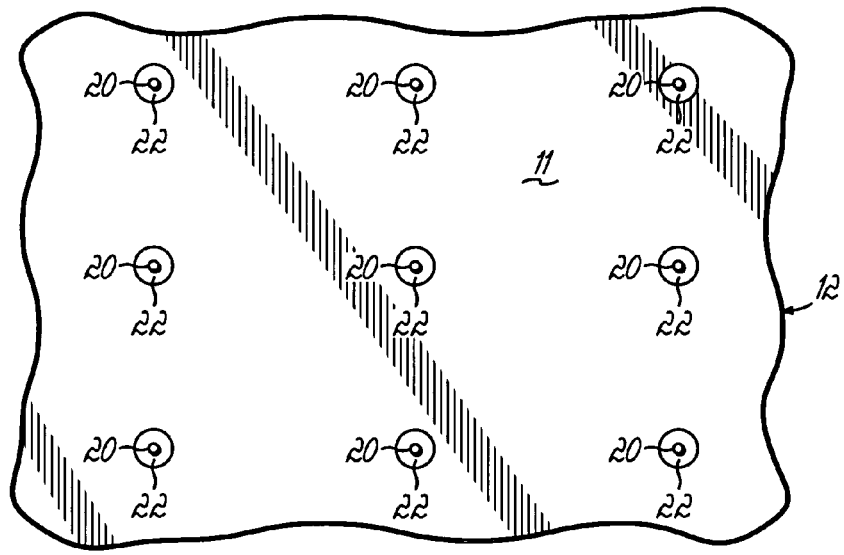
FIG. 5A is a top view of the substrate of FIG. 5.
Figure 5B:
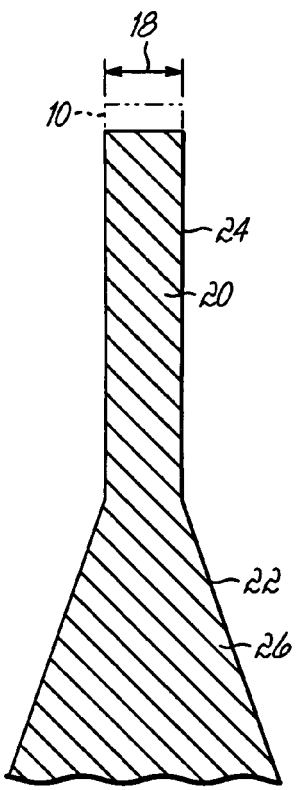
FIG. 5B is an enlarged view of a portion of FIG. 5.

With reference to FIGS. 5, 5A and 5B in which like reference numerals refer to like features in FIGS. 4 and 4A and at a subsequent fabrication stage, sequential dry etching processes are used to fabricate a probe tip 20 and a flared post 22 underlying the probe tip 20. The probe tip 20 is formed by an anisotropic etch in which the etch rate in a vertical direction normal to the front surface 11 is much higher than in a horizontal direction parallel to the front surface 11. As a result, a sidewall 24 of the probe tip 20 is substantially vertical and undercutting is absent. The flared post 22 is then formed by a dry etching process that is anisotropic and directional. A sidewall 26 of the probe tip 20 is inclined relative to the vertical and has a generally frustoconical shape. The dry etching processes forming the probe tip 20 and the flared post 22 etch the material constituting the substrate at a significantly higher rate than the material constituting hard mask 10. Hence, masked areas 18 of wafer 12 protected by hard mask 10 are not etched by the etching processes. After the conclusion of the dry etching processes, the residual hard mask material from hard mask 10 overlying the masked areas 18 is removed by a suitable etch process that etches the hard mask material selective to the material constituting wafer 12.

The anisotropic etching process forming probe tip 20 involves exposing the wafer 12 to a plasma formed from a source gas including a mixture of a bromine-containing gas, such as hydrogen bromide (HBr), and an oxygen-containing gas, such as molecular oxygen ($O_2$). In certain embodiments of the invention, the ratio of a volumetric flow rate of the bromine-containing gas in the source gas to a volumetric flow rate of the oxygen-containing gas is in a range of about eight (8) to about forty (40) and, preferably, about forty (40). A third gas selected from a chlorine-containing gas such as chlorine ($Cl_2$), a fluorine-containing gas, or mixtures thereof may be added to the source gas. In one embodiment of the invention, the source gas used for generating the plasma used to etch the probe tip 20 includes HBr flowed at 80 standard cubic centimeters per minute (sccm), $Cl_2$ flowed at 5 sccm, and $O_2$ flowed at 2 sccm, the chamber pressure is about 150 mTorr, and the plasma power is about 250 watts.

The exposure of the wafer 12 to the plasma is controlled as understood by persons of ordinary skill in the art in a manner that promotes anisotropic etching. The oxygen in the source gas(es) forms a protective passivation film on the vertical sidewall 24 that substantially eliminates additional erosion by operating as a mask. The selected etch time is commensurate with forming probe tips 20 having a length of about 500 nanometers or less.

Generally, the masked areas 18 are dimensioned such that the probe tip 20 is characterized by a diameter greater than about 20 nanometers. In certain embodiments, the masked areas 18 may be dimensioned such that the probe tip 20 is characterized by a diameter less than about 2.5 microns. In other embodiments, the masked areas 18 may be dimensioned such that the probe tip 20 is characterized by a diameter less than about 300 nanometers. In yet other embodiments, the masked areas 18 may be dimensioned such that the probe tip 20 is characterized by a diameter less than about 30 nanometers. Regardless of the diameter, the probe tip 20 is characterized by a length-to-width aspect ratio greater than about three (3).

The etching process forming flared post 22 involves exposing the wafer 12 to a plasma generated from a source gas including a mixture of a bromine-containing gas, such as HBr, and an oxygen-containing gas, such as molecular oxygen $O_2$. Generally, the ratio of the bromine-containing gas to the oxygen-containing gas in the source gas for the etching process forming sidewall 26 of flared post 22 is less than the ratio of the bromine-containing gas to the oxygen-containing gas in the source gas for the etching process forming sidewall 24 of probe tip 20. In certain embodiments, the ratio of a volumetric flow rate of the bromine-containing gas in the source gas to a volumetric flow rate of the oxygen-containing gas is in a range of about five (5) to about sixteen (16) and, preferably, about sixteen (16). The source gas may further include a third gas selected from a chlorine-containing gas, a fluorine-containing gas, or mixtures of these gases. In specific one embodiment of the invention, the source gas for the plasma used to etch the flared post includes HBr flowed at 80 sccm, $Cl_2$ flowed at 5 sccm, and $O_2$ flowed at 5 sccm, the chamber pressure is about 150 mTorr, and the plasma power is about 180 watts. The exposure of the wafer 12 to the plasma is controlled as understood by persons of ordinary skill in the art so that the promoted etching is not anisotropic. The oxygen in the source gas(es) forms a protective passivation film on the tapered sidewall that restricts additional erosion to provide the frustoconical appearance.

The sequential etching processes may be performed in any suitable vacuum chamber as a single continuous process by changing the composition of the source gas mixture after a first fixed time sufficient to form the probe tip 20 and then etching for a second fixed time to form the flared post 22. Generally, the etch rate for the dry etching process forming the probe tip 20 is higher than the etch rate for the dry etching process forming the flared post 22. The dry etching process forming the probe tip 20 is also typically performed at a higher etch power than the dry etching process forming the flared post 22. A suitable etch rate for forming the probe tip 20 is in the range of about 50 nanometers per minute to about 200 nanometers per minute. The invention contemplates that dry etching processes can be used to simultaneously etch multiple wafers 12.

Figure 6:
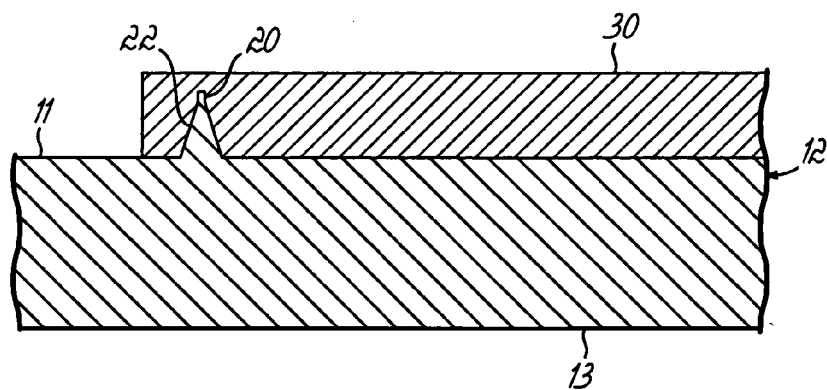
FIG. 6 is a cross-sectional view similar to FIG. 5 at a subsequent fabrication stage.
Figure 7:
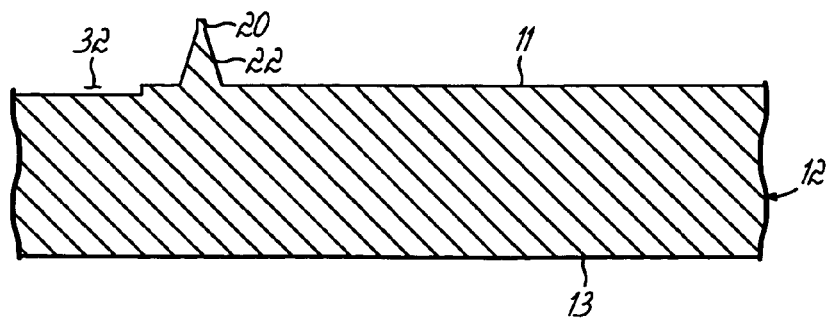
FIG. 7 is a cross-sectional view similar to FIG. 6 at a subsequent fabrication stage.
Figure 8:
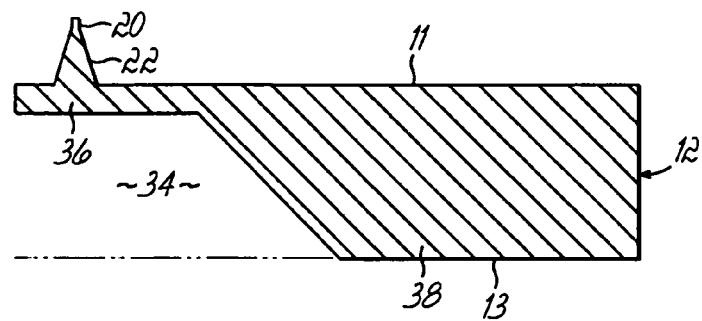
FIG. 8 is a cross-sectional view similar to FIG. 7 at a subsequent fabrication stage.
Figure 8A:
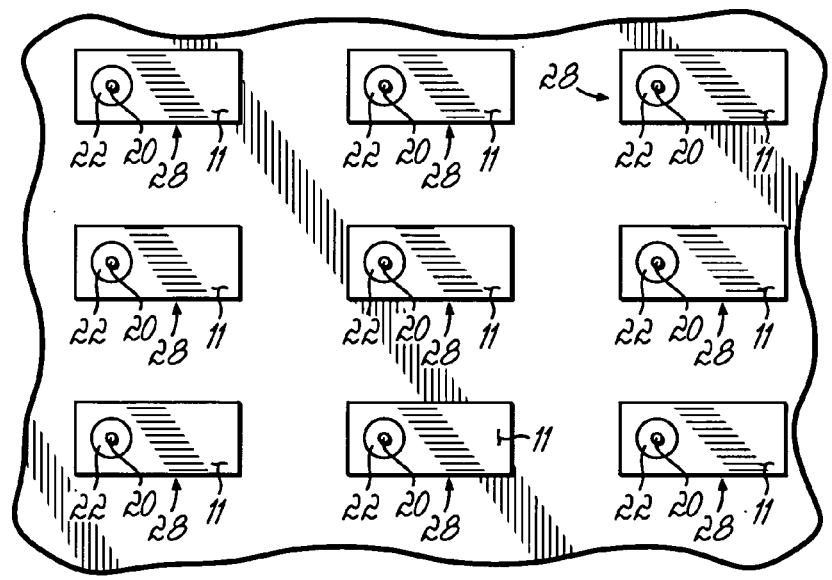
FIG. 8A is a top view of the substrate of FIG. 8.

With reference to FIGS. 6–8 in which like reference numerals refer to like features in FIGS. 5A and 5B and at a subsequent fabrication stage, a plurality of substrates 28 (FIG. 8A) are prepared by a series of conventional lithography and etching steps. Each lithographic process involves applying a layer of radiation-sensitive resist to the wafer 12, exposing the resist layer through a conventional photomask to impart a latent projected image pattern characteristic of the intended recessed features, and developing the resist layer to transform the latent image pattern into a final image pattern in the resist layer. Unmasked areas of wafer 12 are subsequently removed by any suitable etching process capable of producing the recessed features. Areas of wafer 12 masked by the resist layer are protected during the etching process.

With specific reference to FIG. 6, the front surface 11 of wafer 12 is masked with a resist layer 30, which is patterned using a conventional lithographic operation. The resist layer 30 covers and protects the probe tips 20 and flared posts 22. With specific reference to FIG. 7, the front surface 11 is etched using a conventional etching process defining multiple recesses, generally indicated by reference numeral 32, each proximate to one of the flared posts 22. With specific reference to FIG. 8, recesses 34 are defined in the rear surface 13 of wafer 12 by one or more conventional lithography and backside etching steps that remove wafer material from the wafer backside beneath each probe tip 20 and flared post 22. In this manner, each substrate 28 is defined by a cantilever 36 projecting from a base 38. The individual substrates 28 are plugged out of the wafer 12 after etching is concluded.

Figure 9:
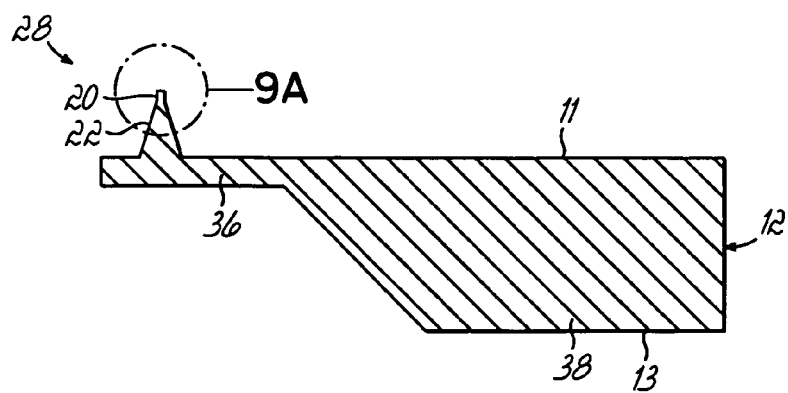
FIG. 9 is a cross-sectional view similar to FIG. 8 at a subsequent fabrication stage.
Figure 9A:
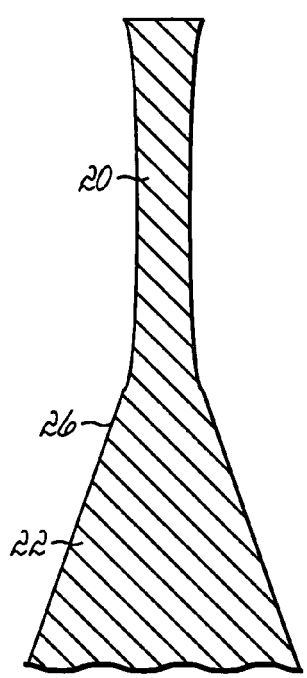
FIG. 9A is an enlarged view of a portion of FIG. 9.

With specific reference to FIGS. 9 and 9A in which like reference numerals refer to like features in FIG. 8 and at a subsequent fabrication stage, the backside etching process forms a large number of individual substrates 28 each including one base 38, one cantilever 36, and one probe tip 20 proximate the apex of one flared post 22. The probe tips 20, which are suitable for use in an atomic force microscope, may be oxidation sharpened as best shown in FIG. 9A, before the individual substrates are plugged out of wafer 12 after backside etching is concluded. The oxidation sharpening process causes the sidewall 26 to inwardly curve, as visible in FIG. 9A.

The batch process forming the substrates 28 that ultimately define multiple AFM probes may be characterized by a product yield. The product yield may be defined as the number of functional or usable probe tips 20 produced by the dry etching processes as compared to the number of probe tips 20 fabricated and may vary among successive batch processes. The product yield for mass production of the substrates 28 may be characterized using one or more parameters relating to the diameter of probe tip 20, the length of probe tip 20, and/or the length-to-width aspect ratio of probe tip 20 as a criterion for qualification.

In one embodiment, the yield of a batch process forming probe tips 20 having a diameter less than about 30 nanometers is at least about 5 percent. In another embodiment, the yield of a batch process forming probe tips 20 having a diameter less than about 30 nanometers is at least about 25 percent. In yet another embodiment, the yield of a batch process forming probe tips 20 having a diameter less than about 30 nanometers is at least about 50 percent the probe tip 20. In yet another embodiment, the yield of a batch process forming probe tips 20 having a diameter less than about 30 nanometers is at least about 95 percent.

In another embodiment, the yield of a batch process forming probe tips 20 characterized by a length of less than about 500 nanometers is at least about 50 percent. In still another embodiment, the yield of a batch process forming probe tips 20 characterized by a length of less than about 500 nanometers is at least about 75 percent. In yet another embodiment, the yield of a batch process forming probe tips 20 characterized by a length of less than about 500 nanometers is at least about 90 percent. Alternatively, and in any of these specific embodiments, the length-to-width aspect ratio of the listed percentage of the probe tips 20 may be greater than about three (3).

In another embodiment, the yield of a batch process forming probe tips 20 characterized by a diameter of less than about 300 nanometers and a length-to-width aspect ratio of greater than about three (3) is at least about 50 percent. In yet another embodiment, the yield of a batch process forming probe tips 20 characterized by a diameter of less than about 300 nanometers and a length-to-width aspect ratio of greater than about three (3) is at least about 75 percent. In yet another embodiment, the probe tip 20 of at least about 90 percent of the substrates 28 may be characterized by a diameter of less than about 300 nanometers and a length-to-width aspect ratio of greater than about three (3).

The probe tips 20 may be qualified using any appropriate criteria after manufacture for use in an atomic force microscope. One advantage of the present invention is that it may produce probe tips 20 with such uniformity as to eliminate the need from individual inspection. Specifically, to qualify probes, only one or more dimensions of a control sample of one or more of the probe tips 20 may be measured. Then, a range of dimensions may be determined for the control sample to qualify at least one probe or substrate 28 manufactured on, and in, the wafer 12 for shipment to a customer without individual inspection of the probe tip 20 carried by all substrates 28.

The dry etching processes used to manufacture the probe tips 20 provides the repeatability that can permit such qualification without the necessity of individual inspections of all probe tips 20. More specifically, the ability to form probe tips 20 only at intended locations and without introducing extraneous protrusions at unintended locations, as observed for probe tips similar to probe tips 20 formed using conventional dry etching recipes, permits measurement of at least one dimension of only a representative control sample for qualifying an entire batch of probe tips 20. Decreasing the time required to analyze product yield and improving product yield translates into more probes that may be sold by the manufacturer and, hence, has a direct economic impact to the manufacturer.

The probe tips 20 of the invention may be used, for example, to measure critical dimensions (CDs) during integrated circuit (IC) fabrication with a high degree of accuracy and nondestructively. More specifically, the probe tips 20 may be used to measure the critical dimension of an IC feature, such as the width of a patterned line, the distance between two lines or devices, or the size of a contact.

Figure 10:
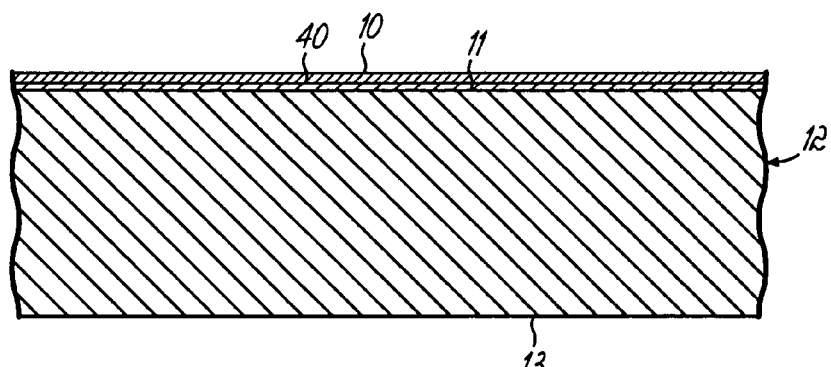
FIG. 10 is a diagrammatic cross-sectional view of a portion of a substrate in accordance with an alternative embodiment of the invention.

With reference to FIG. 10 in which like reference numerals refer to like features in FIG. 1 and in accordance with an alternative embodiment of the invention, a layer 40 of a material different from the material forming the wafer 12 is provided between the hard mask 10 and the wafer 12. The material constituting layer 40 may be diamond, diamond-like carbon, silicon carbide, silicon nitride, silicon dioxide, titanium dioxide, aluminum oxide, or any combinations of these materials, and may be deposited or grown by any conventional technique recognized by a person of ordinary skill in the art.

Figure 11:
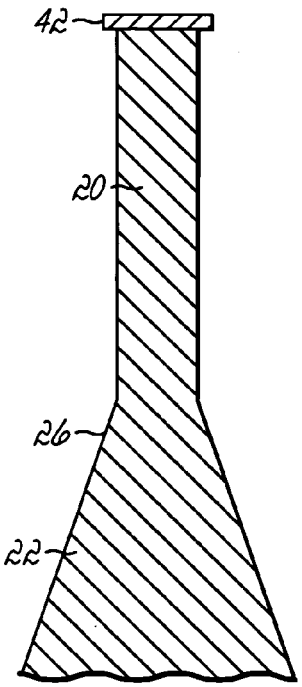
FIG. 11 is a cross-sectional view of a probe tip fabricated from the substrate of FIG. 10.

With reference to FIG. 11, in this alternative embodiment, probe tip 20 is covered by a cap 42 of material originating from layer 40 after a processing stage equivalent to that depicted in FIG. 4. An anisotropic etching process, which may be similar or different from the anisotropic etching process forming probe tip 20, is used to etch cap 42. In certain embodiments of the invention, the cap 42 operates to increase the wear resistance of the probe tip 20 during use in an AFM. In other embodiments, the material forming the cap 42 is harder than the material forming the underlying probe tip 20. The material of cap 42 may be effective for increasing the operational lifetime of the probe tip 20 in use in an AFM as compared with another probe tip lacking a cap 42 of the material. The cap 42 may be undercut by the etching processes and the corners of the cap 42 may similarly be slightly rounded.

Figure 12:
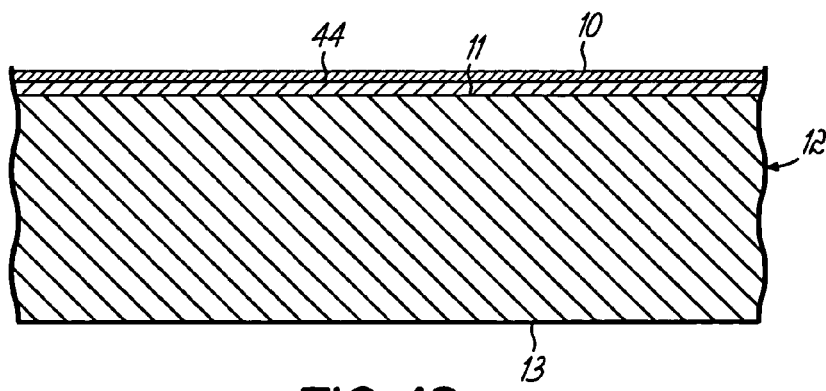
FIG. 12 is a diagrammatic cross-sectional view of a portion of a substrate in accordance with another alternative embodiment of the invention.

With reference to FIG. 12 in which like reference numerals refer to like features in FIG. 1 and in accordance with another alternative embodiment of the invention, a layer 44 of a material different from the material forming the wafer 12 is provided between the hard mask 10 and the wafer 12. The material constituting layer 44 may be diamond, diamond-like carbon, silicon carbide, silicon nitride, silicon dioxide, titanium dioxide, aluminum oxide, or any combinations of these materials, and may be deposited or grown by any conventional technique recognized by a person of ordinary skill in the art. In certain embodiments, the layer 44 may be formed epitaxially with the wafer 12.

Figure 12A:
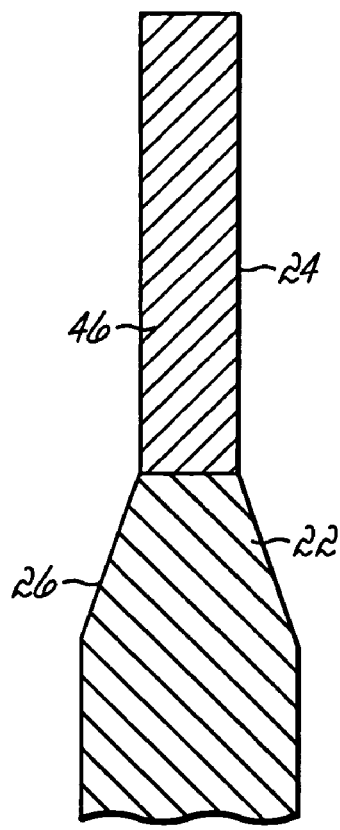
FIG. 12A is an enlarged view similar to FIG. 11 of a probe tip fabricated from the substrate of FIG. 12.

With reference to FIG. 12A, in this alternative embodiment, the thickness of layer 44 is sufficient such that a probe tip 46 constituted at least in part by the material of layer 44 may be formed using a suitable anisotropic etching process at a process stage equivalent to that depicted in FIG. 4. More specifically, the probe tip 46 is formed by etching layer 44 using a suitable anisotropic etching process capable of directionally defining vertical sidewalls in the material characterizing layer 44. Although the probe tip 46 is depicted in FIG. 12A as composed completely of material originating from layer 44, the invention is not so limited as illustrated by cap 42 (FIG. 11). Forming the probe tip 46 at least partially from the material of layer 42 may be effective for increasing the operational lifetime of the probe tip 46 and/or the wear resistance of probe tip 46 when in use in an AFM as compared to another probe tip not including such a material.

Figure 13A:
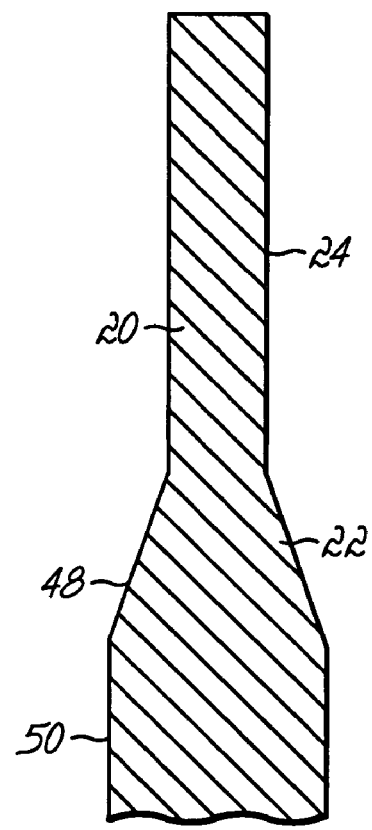
FIG. 13A is an enlarged view of a portion of the probe tip of FIG. 13.
Figure 13:
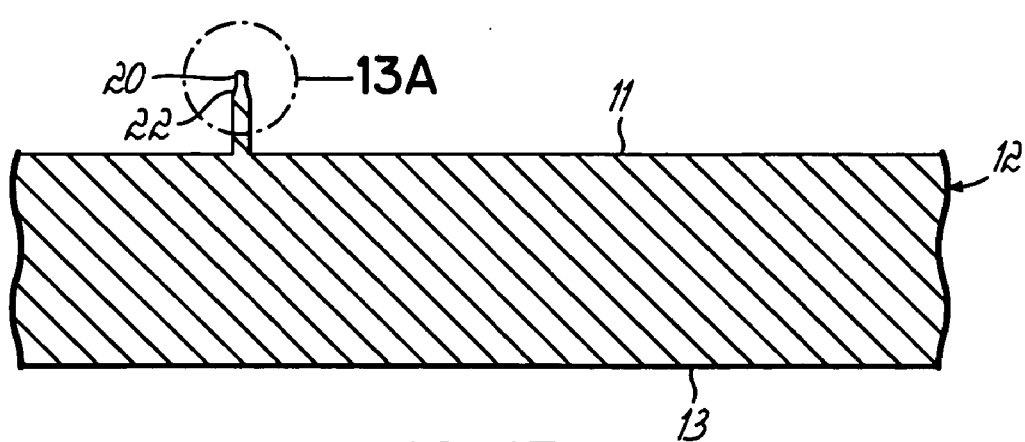
FIG. 13 is a diagrammatic cross-sectional view of a portion of a substrate in accordance with yet another alternative embodiment of the invention.

With reference to FIGS. 13 and 13A in which like reference numerals refer to like features in FIG. 4 and in accordance with yet another alternative embodiment of the invention, the etching process forming the flared post 22 may optionally incorporate a third sequential dry etching process that is anisotropic. Specifically, after the probe tip 20 is formed by an anisotropic etching process and a frustoconical post section 48 of the flared post 22 is formed by another individual etching process that is not anisotropic, an anisotropic dry etching process may be implemented to define a vertical post section 50 extending from frustoconical post section 48 to the substrate 28.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicants' general inventive concept.

What is claimed is:

1. A probe for a scanning probe microscope, comprising:
a cantilever;
a tip having a first end, a second end, and a substantially vertical sidewall extending between said first and second ends, said tip including at least one semiconductor material;
a wear-resistant layer on said first end of said tip, said wear-resistant layer including a wear-resistant material different from said at least one semiconductor material of said tip, and said wear resistant layer including at least one peripheral edge extending laterally beyond said substantially vertical sidewall of said tip; and
a post converging toward said second end of said tip, said post configured to couple said tip with said cantilever.

2. The probe of claim 1 wherein said wear-resistant material has a greater wear resistance than said at least one semiconductor material forming said tip.

3. The probe of claim 2 wherein said at least one semiconductor material comprises silicon.

4. The probe of claim 1 wherein said wear-resistant material is effective to increase the operational lifetime of said tip as compared with another probe lacking said cap.

5. The probe of claim 1 wherein said wear-resistant material selected from the group consisting of diamond, diamond-like carbon, silicon carbide, silicon nitride, silicon dioxide, titanium dioxide, aluminum oxide, and combinations thereof.

6. The probe of claim 5 wherein said at least one semiconductor material comprises silicon.

7. The probe of claim 1 wherein said substantially vertical sidewall is cylindrical.

8. The probe of claim 1 wherein said post is frustoconical.

9. The probe of claim 8 wherein said frustoconical post converges toward said substantially vertical sidewall.

10. A probe for coupling with a scanning probe microscope to analyze a surface, comprising:
a tip having a first end, a second end, and a substantially vertical sidewall extending between said first and second ends, said tip including at least one semiconductor material;
a post having a frustoconical portion converging toward said said second end of said tip, said post configured to couple said probe with the scanning probe microscope; and
a wear-resistant layer on said first end of said tip, said wear-resistant layer located between said tip and the surface when said post is coupled with the scanning probe microscope, and said wear resistant layer including at least one peripheral edge extending laterally beyong said substantially vertical sidewall of said tip.

11. The probe of claim 10 wherein said wear-resistant layer material is selected from the group consisting of diamond, diamond-like carbon, silicon carbide, silicon nitride, silicon dioxide, titanium dioxide, aluminum oxide, and combinations thereof.

12. The probe of claim 10 wherein said tip includes a second material, and said first material has a greater wear resistance than said second material.

13. The probe of claim 12 wherein said second material comprises silicon.

14. The probe of claim 10 wherein said tip includes a second material comprising silicon.

15. A probe for a scanning probe microscope, comprising:
a tip having a first end, a second end, and a substantially vertical sidewall extending between said first and second ends, said tip including at least one semiconductor material;
a wear-resistant layer on said first end of said tip, said wear-resistant layer including a wear-resistant material different from said at least one semiconductor material of said tip, and said wear resistant layer including at least one peripheral edge extending laterally beyond said substantially vertical sidewall of said tip; and
a post converging toward said second end of said tip, said post configured to couple said tip with said probe and with the scanning probe microscope.

16. The probe of claim 15 wherein said wear-resistant material has a greater wear resistance than said at least one semiconductor material.

17. The probe of claim 16 wherein said at least one semiconductor material is silicon.

18. The probe of claim 15 wherein said wear-resistant material of said cap is effective to increase the operational lifetime of said tip as compared with another probe lacking said cap.

19. The probe of claim 15 wherein said wear-resistant material is selected from the group consisting of diamond, diamond-like carbon, silicon carbide, silicon nitride, silicon dioxide, titanium dioxide, aluminum oxide, and combinations thereof.

20. The probe of claim 19 wherein said at least one semiconductor material comprises silicon.

21. The probe of claim 15 wherein said substantially vertical sidewall is cylindrical.

22. The probe of claim 15
wherein said post is frustoconical.

23. A probe for a scanning probe microscope, comprising:
a tip having a first end, a second end, and a substantially vertical sidewall extending between said first and second ends, said tip including at least one semiconductor material;
a wear-resistant layer on said first end of said tip, said wear-resistant layer being formed from a wear-resistant material having a greater wear resistance than said at least one semiconductor material, and said wear resistant layer including at least one peripheral edge extending laterally beyond said substantially vertical sidewall of said tip; and
a post converging toward said second end of said tip, said post configured to couple said tip with said probe and with the scanning probe microscope.

24. The probe of claim 23 wherein said substantially vertical sidewall is cylindrical.

25. The probe of claim 23 wherein said post is frustoconical.

26. The probe of claim 23 wherein said at least one semiconductor material comprises silicon and said wear-resistant material is selected from the group consisting of diamond, diamond-like carbon, silicon carbide, silicon nitride, silicon dioxide, titanium dioxide, aluminum oxide, and combinations thereof.

* * * * *

UNITED STATES PATENT AND TRADEMARK OFFICE
CERTIFICATE OF CORRECTION

PATENT NO.        : 7,370,515 B2  
APPLICATION NO.   : 10/873064  
DATED             : May 13, 2008  
INVENTOR(S)       : Nihat Okulan et al.

It is certified that error appears in the above-identified patent and that said Letters Patent is hereby corrected as shown below:

Column 6, line 58, after "percent", delete "the probe tip 20".

Column 9, line 25, claim 5, after "material", insert --is--.

Column 9, line 43, claim 10, change "said said" to --said--.

Signed and Sealed this

Twelfth Day of May, 2009

JOHN DOLL  
*Acting Director of the United States Patent and Trademark Office*